US007076004B2

(12) United States Patent
Kim et al.

(10) Patent No.: US 7,076,004 B2
(45) Date of Patent: Jul. 11, 2006

(54) APPARATUS AND METHOD FOR ADAPTIVELY DETECTING RECEIVED SIGNALS FOR POWER LINE COMMUNICATION

(75) Inventors: Dong-Sun Kim, Inchon (KR); Doh-Kyung Kim, Suwon-si (KR); Jong-Chan Choi, Pyeongtaek-si (KR); Il-Hyun Chun, Seoul (KR); Chul Kim, Namyangju-si (KR)

(73) Assignee: Korea Electronics Technology Institute, Pyeongtaek-si (KR)

( * ) Notice: Subject to any disclaimer, the term of this patent is extended or adjusted under 35 U.S.C. 154(b) by 676 days.

(21) Appl. No.: 09/917,698

(22) Filed: Jul. 31, 2001

(65) Prior Publication Data

US 2002/0181613 A1 Dec. 5, 2002

(30) Foreign Application Priority Data

May 29, 2001 (KR) ...................... 10-2001-0029584

(51) Int. Cl.
*H03D 1/00* (2006.01)
*H04L 27/06* (2006.01)
(52) U.S. Cl. .................. 375/340; 714/704; 340/310.11
(58) Field of Classification Search ................ 375/316, 375/139, 220, 222, 257, 224, 340, 377; 714/699, 714/704, 703, 709; 340/310.11, 538
See application file for complete search history.

(56) References Cited

U.S. PATENT DOCUMENTS

| 5,575,758 | A | * | 11/1996 | Easterbrook, III | .......... | 600/193 |
| 6,049,563 | A | | 4/2000 | Matsui | ........................ | 375/204 |
| 6,064,695 | A | * | 5/2000 | Raphaeli | ...................... | 375/230 |
| 6,275,922 | B1 | * | 8/2001 | Bertsch | ........................ | 712/36 |

* cited by examiner

*Primary Examiner*—Jean B. Corrielus
(74) *Attorney, Agent, or Firm*—Roylance, Abrams, Berdo & Goodman, L.L.P.

(57) ABSTRACT

The disclosed apparatus includes a main control unit (MCU) interface unit for adjusting the timing of data transmission, a register unit for storing control data, a threshold value, an offset value, and an error rate received from the MCU interface unit, and for outputting the stored data and values, a control logic unit for controlling selection of a threshold value, based on the control data stored in the register unit, a reference data selecting unit for selectively outputting, as threshold values, the threshold value and offset value respectively stored in the register unit or an external threshold value and an external offset value, under control of the control logic unit, and a data processing unit for determining, based on threshold values to be selectively outputted by the reference data selecting unit, whether or not the serial data received via a power line is valid data, and for outputting the data.

2 Claims, 4 Drawing Sheets

APPARATUS AND METHOD FOR ADAPTIVELY DETECTING RECEIVED SIGNALS FOR POWER LINE COMMUNICATION

BACKGROUND OF THE INVENTION

1. Field of the Invention

The present invention relates to power line communication in which transmission and reception of desired data are carried out using a power line as a communication channel, and more particularly to an apparatus and a method for adaptively detecting received signals for power line communication, which are capable of stably receiving desired data transmitted via a power line irrespective of variations in channel characteristics.

2. Description of the Related Art

The use of a power line as a communication channel provides a remarkable advantage in that additional expenses are not required for the construction of a new communication channel. That is, since power lines to supply electricity have been distributed over most areas in the world, those areas are not different from having already been equipped with a communication channel.

However, originally, power lines are not intended for a communication channel, but for the supply of electricity. For this reason, such power lines exhibit degraded characteristics for a communication channel. For example, where diverse electric home appliances are operated using electric power supplied through a power line, noise may be generated by such operation. This noise may be induced into the power line, thereby varying the communication channel characteristics of the power line. As a result, loss of data transmitted on the power line may occur.

Therefore, it is necessary to accurately check the channel characteristics of the power line for power line communication in order to apply a desired algorithm meeting the checked channel characteristics.

In order to reduce the data loss resulting from noise on power lines, communication technologies using a spread spectrum technique have been proposed.

The spread spectrum technique is a method in which pseudo noise is added to transmitted signals. This technique has mainly been used for military systems because it provides characteristics strong against noise. Among such spread spectrum techniques, there are a direct sequence (DS) method, a frequency hopping (FH) method, and a chirp method.

In particular, power line communication systems using the chirp method have an advantage in that it provides characteristics strong against noise, as compared with other spread spectrum techniques, even though it exhibits inferior characteristics in terms of transmission rate. Thus, this technique may be more suitable for the channel environment using power lines.

Generally, a chirp signal used on power lines has a frequency sustained at 100 to 400 kHz for 100 μs, varied between 200 kHz and 400 kHz, and then varied between 100 kHz and 200 kHz. Power line communication systems using the chirp method conduct data transmission and reception operations using chirp signals of the same type in a certain frequency band.

However, the load attenuating characteristics of power lines are non-uniform in the entire frequency band. As shown in FIG. 1, power lines exhibit a severe variation in load attenuating characteristics. For this reason, loss of transmitted data occurs in a particular frequency band.

In particular, in the case of a power line communication system which shows various attenuation characteristics, depending on the sort of electric appliances in use or the installation place, it may be impossible to detect received signals because data loss occurs in the frequency band exhibiting a severe attenuation, for a particular frequency band or particular chirp signal.

In communication systems using a spread spectrum technique, it is necessary to use a signal tracking circuit for detecting received signals. This signal tracking circuit tends to be complicated because it should conduct a comparison of received signals with a reference value and a calculation of a maximum value. For this reason, there is a limitation to reducing the manufacturing costs.

SUMMARY OF THE INVENTION

An object of the invention is to provide an apparatus and a method for adaptively detecting received signals for power line communication which are capable of monitoring the channel state of a power line used as a communication channel, and adjusting a threshold value based on the monitored channel state to obtain an optimized data reception rate, thereby achieving a stable reception of desired data.

And another object of the invention is to provide an apparatus and a method for adaptively detecting received signals for power line communication which are capable of correctly receiving desired data using two threshold values.

In accordance with one aspect, the present invention provides an apparatus for adaptively detecting received signals for power line communication, comprising: a main control unit (MCU) interface unit for adjusting a timing of data transmission; a register unit for storing control data, a threshold value, an offset value, and an error rate received from the MCU interface unit, and for outputting the stored data and values; a control logic unit for controlling a selection of threshold values, based on the control data stored in the register unit; a reference data selecting unit for selectively outputting, as the threshold values, the threshold value and offset value respectively stored in the register unit or an external threshold value and an external offset value, under control of the control logic unit; and a data processing unit for determining, based on threshold values selectively outputted by the reference data selecting unit, whether or not the serial data received via a power line is effective data, and for outputting the received data.

The data processing unit may comprise: a data shift unit for shifting the serial data received via the power line, thereby outputting the data in parallel; a comparing unit for comparing the output signal from the data shift unit with the offset value when the reference data selecting unit selectively output, the threshold value and the offset value, as the threshold values; a first compressing unit for compressing an output signal from the comparing unit; a second compressing unit for re-compressing an output signal from the first compressing unit; a summing unit for summing output signals from the second compressing unit; and a determining unit for comparing an output signal value from the summing unit with the threshold value when the reference data selecting unit selectively outputs, the threshold value and the offset value, as the threshold values, thereby determining whether or not the output signal value from the summing unit is effective data, and for transmitting the determined value to the MCU.

In accordance with another aspect, the present invention provides a method for adaptively detecting received signals for power line communication comprising the steps of: (a) receiving control data, a threshold value, an offset value, and an error rate from a main control unit (MCU), storing the received data and values, and then waiting for receiving serial data via a power line; (b) if serial data is received at the step (a), then determining, based on the threshold value and offset value, whether or not the received serial data is valid data; (c) if it is determined at the step (b) that the received serial data is valid data, then outputting a determination value of the valid data; (d) if it is determined at the step (b) that the received serial data is invalid data, then incrementing the number of errors; and (e) if the number of errors incremented at the step (d) is not less than a predetermined allowance value, re-setting the threshold value and offset value as a new threshold value and a new offset value.

The step (b) may comprise the steps of: (b-1) converting the received serial data into parallel data, and then comparing the parallel data with the offset value; (b-2) compressing signals obtained after the comparison at the step (b-1), and summing the compressed signals; and (b-3) comparing the signal obtained after the summing at the step (b-2) with the threshold value, thereby determining whether or not the received serial data is valid data.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, an apparatus and a method for detecting received signals for power line communication in accordance with the present invention will be described in detail with reference to FIGS. 2 to 4.

Figure 2:
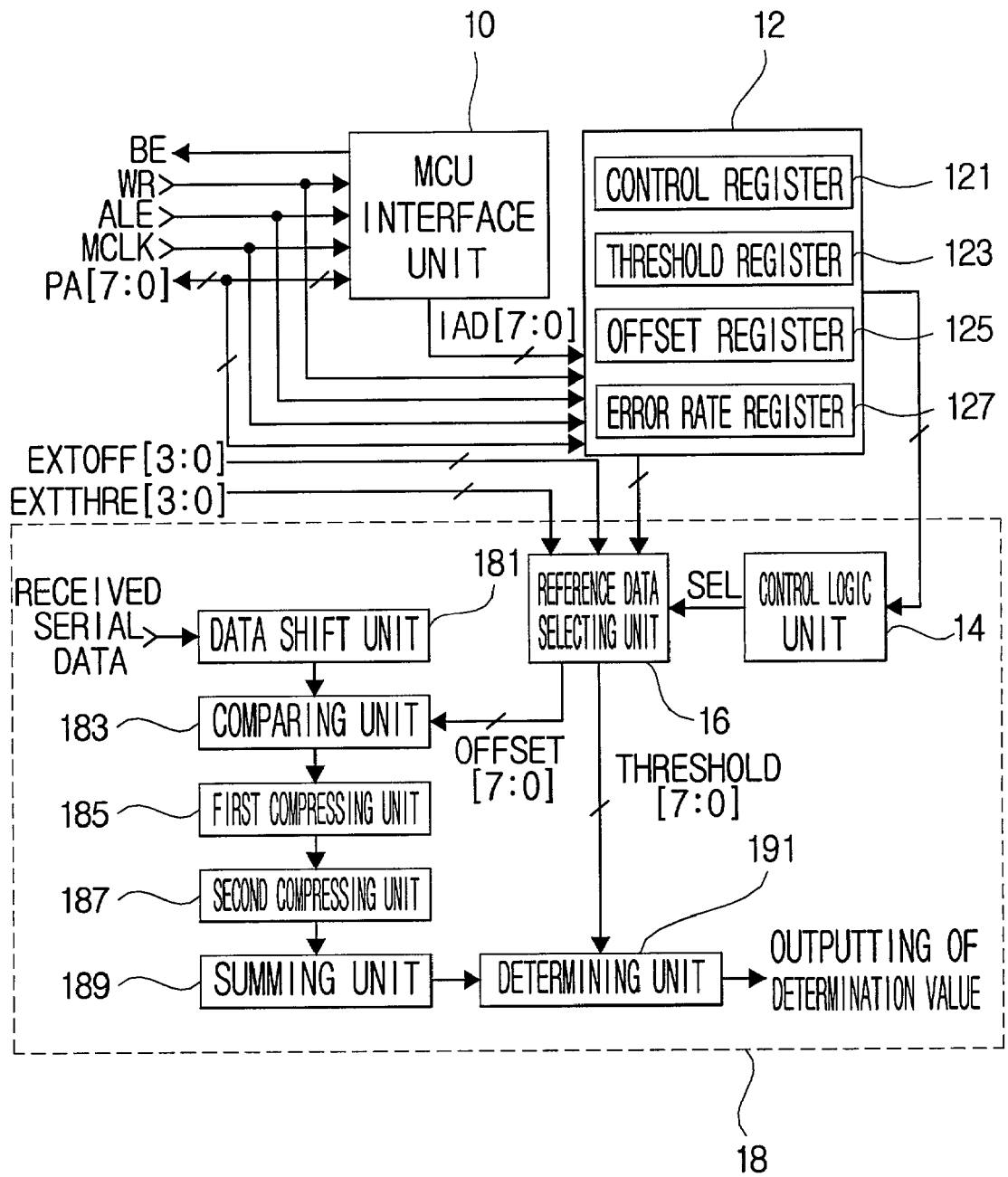
FIG. 2 is a block diagram illustrating the configuration of a received signal detecting apparatus according to the present invention.

FIG. 2 is a block diagram illustrating the configuration of the received signal detecting apparatus according to the present invention. In FIG. 2, the reference numeral 10 denotes a main control unit (MCU) interface unit for controlling the timing of data transmission. The reference numeral 12 denotes a register unit for storing control data, a threshold value, an offset value, and an error rate, and for outputting the stored data and values. The register unit 12 includes a control register 121, a threshold register 123, an offset register 125, and an error rate register 127 to store and output the control data, threshold value, offset value, and error rate.

The reference numeral 14 denotes a control logic unit for controlling the selection of threshold values, based on the control data stored in the control register 121 of the register unit 12. The reference numeral 16 denotes a reference data selecting unit for selectively outputting, as the threshold values, the threshold value and offset value respectively stored in the threshold register 123 and offset register 125 of the register unit 12 or an external threshold value EXT-THRE and an external offset value EXTOFF, under control of the control logic unit.

The reference numeral 18 denotes a data processing unit for determining, based on the threshold values selectively outputted by the reference data selecting unit 16, whether or not the serial data received via the power line is effective data, and for outputting the received data. The data processing unit 18 includes a data shift unit 181 for shifting the serial data received via the power line, thereby outputting the data in parallel, a comparing unit 183 for comparing the output signal from the data shift unit 181 with the offset value when the reference data selecting unit 16 selectively outputs, the threshold value and the offset value, as said threshold values a first compressing unit 185 for compressing an output signal from the comparing unit 183, a second compressing unit 187 for re-compressing an output signal from the first compressing unit 185, a summing unit 189 for summing output signals from the second compressing unit 185, and a determining unit 191 for comparing an output signal value from the summing unit 189 with the threshold value when the reference data selecting unit 16 selectively outputs, the threshold value and the offset value, as said threshold values thereby determining whether or not the output signal value from the summing unit 189 is effective data.

In the received signal detecting unit of the present invention having the above mentioned configuration, control data, a threshold value, an offset value and an error rate are initially inputted from an MCU via an MCU interface unit 10. These data and values are stored in the control register 121, threshold register 123, offset register 125, and an error rate register 127, respectively.

When received serial data is inputted via the power line under this condition, it is determined, based on the value stored in the register unit 12, whether or not the received serial data is erroneous. Where there is no error in the received serial data, this received serial data is decoded to output a desired control signal or data.

Figure 3:
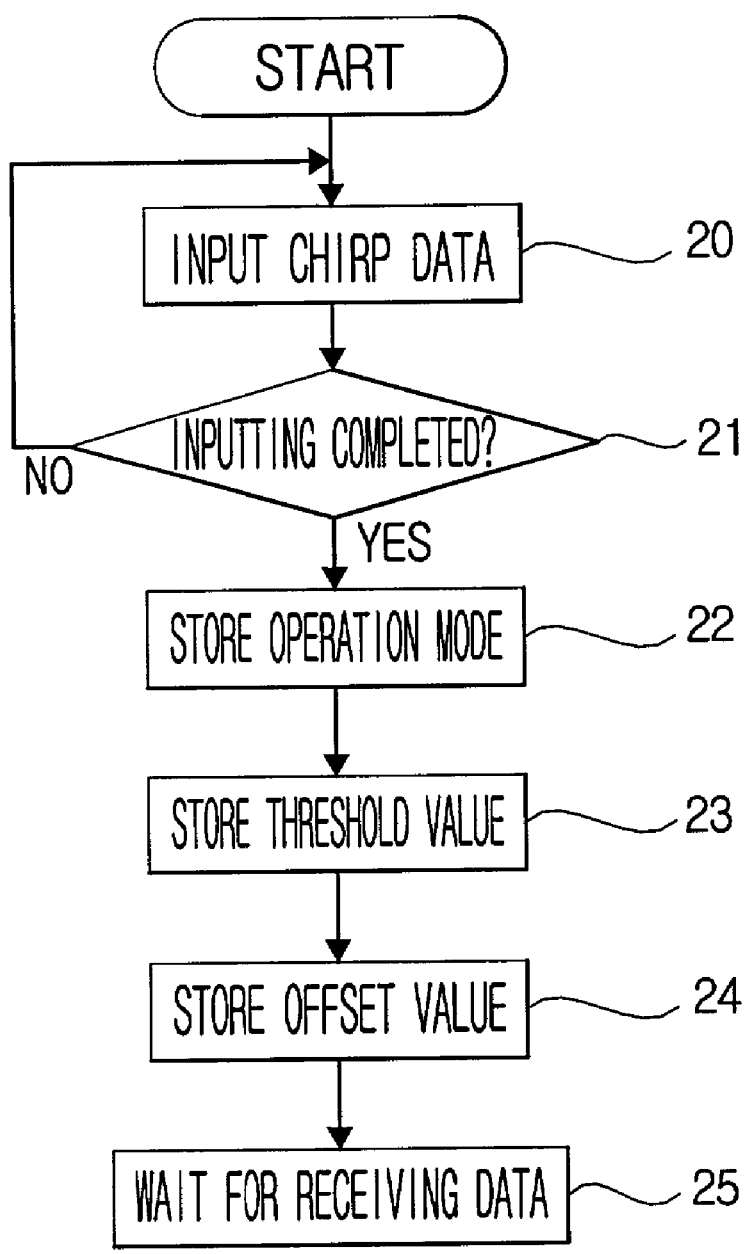
FIG. 3 is a flow chart illustrating an initialization operation according to a received signal detecting method of the present invention.
Figure 4:
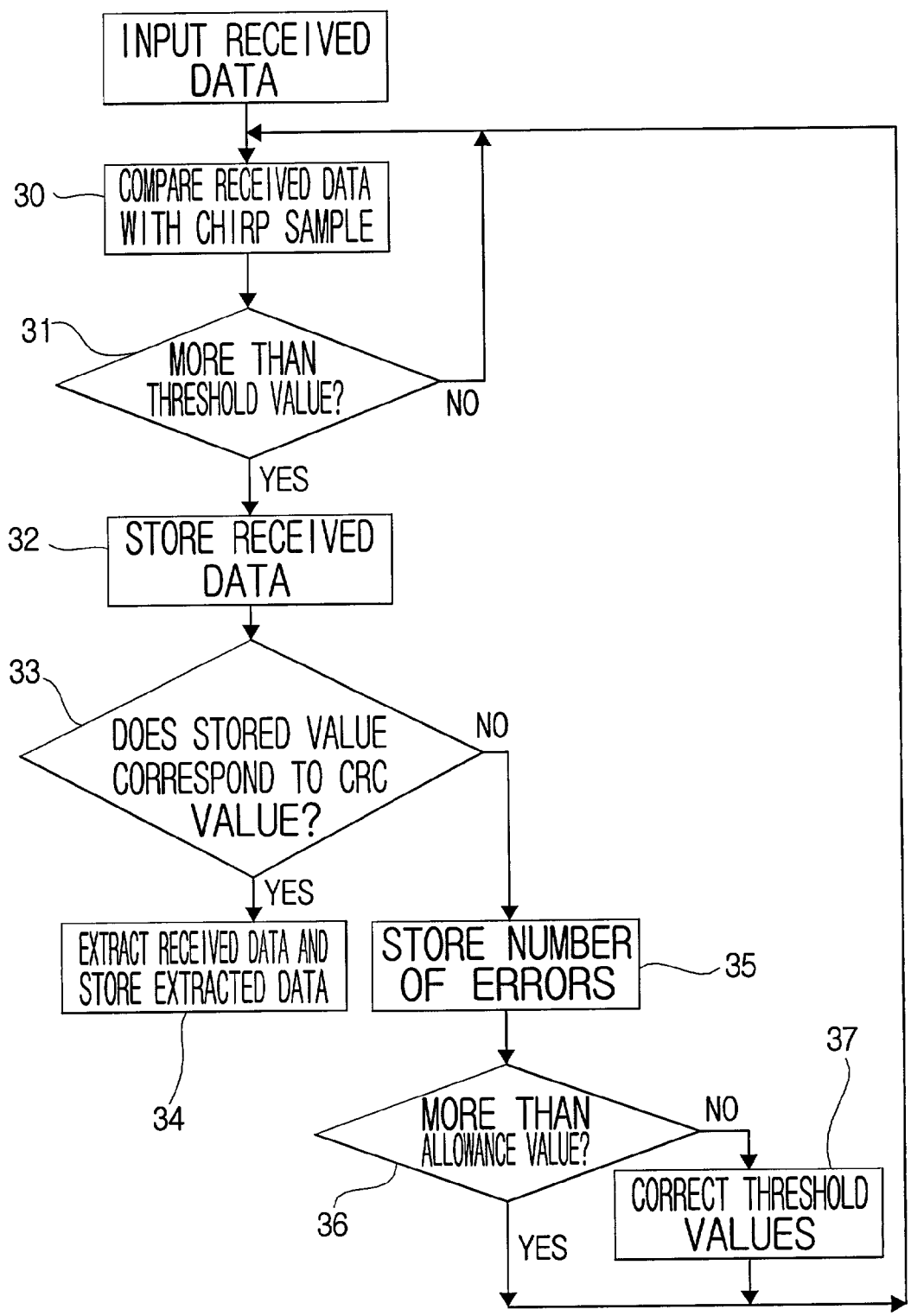
FIG. 4 is a flow chart illustrating a data processing operation according to the received signal detecting method of the present invention.

FIG. 3 is a flow chart illustrating an initialization operation according to the received signal detecting method of the present invention. In the initialization operation, the MCU interface unit 10 inputs chirp data required to decode serial data received via the power line, based on a bus enable signal BE, a write control signal WR, an address latch enable signal ALE, a main clock signal MCLK, and an address/data signal PA outputted from the MCU, at step 20 of FIG. 3.

For the chirp data, a maximum of 390 data can be stored. This means that sample data is maintained for 100 μs at an operating rate of 3.578947 MHz.

When the chirp data is completely inputted at step 21, it is then stored in the register unit 12 via an internal address/data line IAD. That is, the operating mode of the received signal detecting apparatus is set, based on the input data, at step 22. The set operating mode is stored in the control register 121 of the register unit 12. In other words, the operating mode of the received signal detecting apparatus is determined by determining whether chirp signals having the same phase or chirp signals of 180°-shifted phase are to be used, taking into consideration the received state of the power line and the number of received signal detecting apparatuses. At this time, the chirp signals of 180°-shifted phase are automatically calculated by the received signal detecting apparatuses, respectively, and then stored.

After the operation mode is set in the above mentioned fashion, threshold values of two steps are stored at steps 23 and 24, respectively. That is, a threshold value is stored in the threshold register 123 of the register unit 12 at step 23. At step 24, an offset value is stored in the offset register 125 of the register unit 12.

Where there is no threshold value or offset value, maximum values are automatically set as the threshold value or offset value.

After the threshold values of two steps are completely stored at steps 23 and 24, the received signal detecting apparatus waits for inputting of received serial data at step 25.

When received serial data is subsequently inputted, the received signal detecting apparatus compares the inputted received serial data with a chirp sample at step 30 of FIG. 4, thereby determining, at step 31, whether or not the received serial data is higher than the set threshold value.

That is, in the data processing unit 18 of the received signal detecting apparatus, its data shift unit 181 shifts the inputted received serial data, thereby outputting the received data in parallel. The comparing unit 183 compares the output signal from the data shift unit 181 with an offset value, that is, a first threshold value selectively outputted from the reference data selecting unit 16, thereby outputting a signal indicative of the result of the comparison. The comparison result signals outputted from the comparing unit 183 is compressed by the first compressing unit 185, re-compressed by the second compressing unit 187, and then summed by the summing unit 189. The output signal from the summing unit 189 is applied to the determining unit 191. In the determining unit 191, the output signal from the summing unit 189 is compared with the threshold value outputted from the reference data selecting unit 16 in order to determine whether or not it is valid data. Based on the result of the determination, the determined value is applied to the MCU.

The determined value outputted from the received signal detecting apparatus to the MCU, that is, the received serial data, is stored in the MCU at step 32. At step 33, it is determined whether or not the stored value corresponds to a value obtained in accordance with a cyclic redundancy check (CRC) calculation. When the stored value corresponds to the CRC value, data is extracted from the body data portion of the received serial data, and then stored.

On the other hand, when it is determined at step 33 that the stored value does not correspond to the CRC value, the number of errors is incremented at step 35. The incremented number of errors is then stored. Subsequently, inputting of received serial data is conducted again. At step 36, it is determined whether or not the number of errors is not less than a predetermined allowance value. Where the number of errors is not more than the predetermined allowance value, the procedure returns to step 30. On the other hand, when the number of errors is not less than the predetermined allowance value, threshold values are adjusted at step 37. That is, the threshold value stored in the threshold register 125 of the register unit 12 and the offset value stored in the offset register 124 are corrected. The adjustment of threshold values is conducted using a maximum integer value not exceeding the value of threshold value/error rate in accordance with the error rate stored by the received signal detecting apparatus.

For example, where the value of threshold value/error rate is more than "1", the threshold value is adjusted to "−1". On the other hand, when the value of threshold value/error rate is less than "1", the threshold value is adjusted to "+1". Thus, it is possible to improve the accuracy of the received signal detecting apparatus while conducting an effective signal detection on a varying power line channel.

In the present invention, the threshold values used in the received signal detecting apparatus are important parameters determining the data reception quality. However, a considerable amount of computations are required in a spread spectrum system in order to accurately detect received serial data That is, the received serial data is compared with a reference value to calculate a maximum value. The calculated maximum value is compared with a threshold value to determine whether or not the received serial data is correct. In this case, comparison and addition are made for 390 values. However, a considerable amount of hardware and a considerable delay time are required for the comparison and addition.

Figure 1:
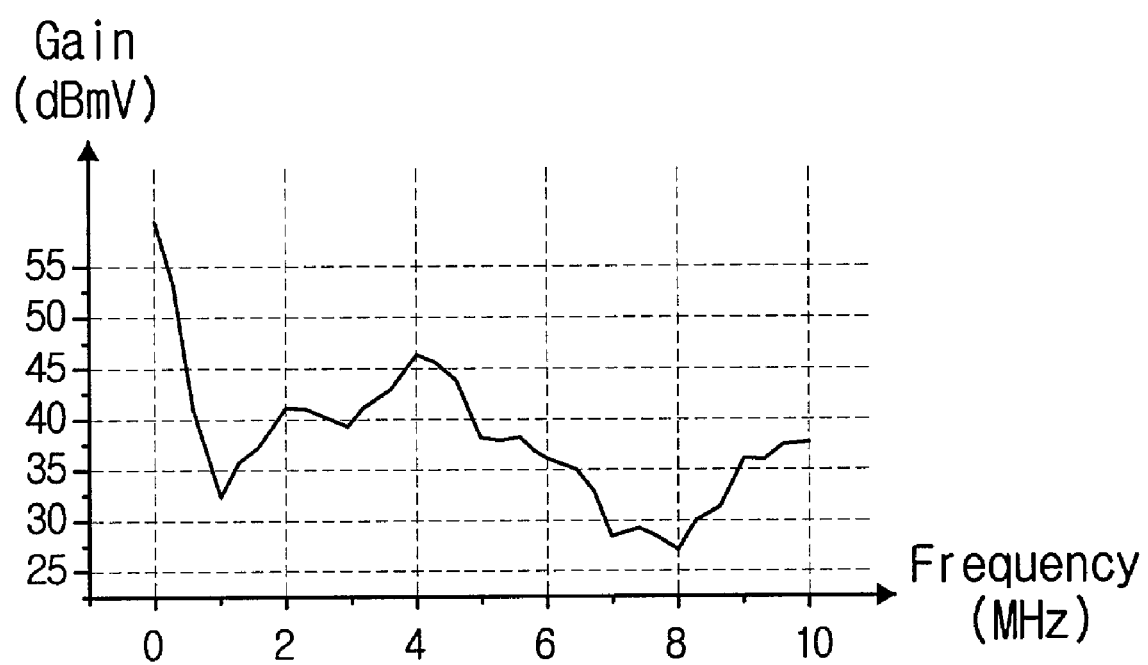
FIG. 1 is a graph illustrating load attenuating characteristics of a power line.

In the case of a general detector, a degradation in the accuracy of received serial data may occur when the above mentioned determination is repeated, even though the final sum has an accuracy of 50%. This is apparent from the channel characteristics of the power line shown in FIG. 1.

In accordance with the present invention, however, the double threshold value, that is, the offset value and threshold value, makes it possible to conduct a comparison of error patterns. Accordingly, more accurate data can be extracted.

A primary comparison is first made for inputted received serial data under the condition in which the inputted received serial data is bound by the 8 bits. That is, the comparing unit 183 determines how many successive data accurately correspond to the received data. In accordance with this procedure, there is an effect of compressing 390 sum data into 54 data. Accordingly, it is possible to more rapidly and accurately detect signals.

The 54 data are re-arranged in the first compressing unit 185, so that they are compressed into 18 data of two digits. These 18 data of two digits are finally compressed into 5 data of four digits in the second compressing unit 187. The 5 data of four digits are finally summed together in the summing unit 189. The value obtained by the final summing unit 189 is compared with the second threshold value by the determining unit 191 in order to finally determine whether or not it is valid data The result value of the computation is stored in a separate memory so that it is transmitted to the MCU, if necessary.

As apparent from the above description, in accordance with the present invention, the channel state of the power line is monitored to adjust the state of the received signal detecting apparatus in such a fashion that it exhibits an optimized reception rate. Accordingly, improvements in the total data rate and accuracy are achieved. It is also possible to reduce the load of hardware and the delay time for computation in accordance with the use of data compressing units and a comparison based on a double threshold value.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for adaptively detecting received signal for power line communication, comprising:
    a main control unit (MCU) interface unit for adjusting a timing of data transmission;
    a register unit for storing control data, a threshold value, an offset value, and an error rate received from said MCU interface unit, and for outputting the stored data and values;

a control logic unit for controlling a selection of threshold values, based on the control data stored in said register unit;

a reference data selecting unit for selectively outputting, as said threshold values, the threshold value and offset value respectively stored in said register unit or an external threshold value and an external offset value, under control of said control logic unit; and a data processing unit for determining, based on said threshold values selectively outputted by said reference data selecting unit, whether or not the serial data received via a power line is valid data, and for outputting the received data;

wherein the data processing unit comprises:

a data shift unit for shifting the serial data received via the power line, thereby outputting the data in parallel;

a comparing unit for comparing the output signal from said data shift unit with the offset value when the reference data selecting unit selectively outputs, the threshold value and the offset value, as said threshold values;

a first compressing unit for compressing an output signal from said comparing unit;

a second compressing unit for re-compressing an output signal from said first compressing unit;

a summing unit for summing output signals from said second compressing unit; and a determining unit for comparing an output signal value from said summing unit with the threshold value when the reference data selecting unit selectively outputs, the threshold value and the offset value, as said threshold values, thereby determining whether or not the output signal value from the summing unit is valid data, and for transmitting the determined value to the MCU.

2. A method for adaptively detecting a receiving signal for power line communication, comprising the steps of:

(a) receiving control data, a threshold value, an offset value, and an error rate from a main control unit (MCU), storing the received data and values, and then waiting for receiving serial data via a power line;

(b) if serial data is received at said step (a), then determining, based on the threshold value and offset value, whether or not the serial receiving data is valid data;

(c) if it is determined at said step (b) that the serial receiving data is valid data, then outputting a determination value of valid data;

(d) if it is determined at said step (b) that the serial receiving data is invalid data, then incrementing a number of errors; and (e) if the number of errors incremented at said step (d) is not less than a predetermined allowance value, resetting the threshold value and offset value as a new threshold value and a new offset value;

wherein said step (b) comprises the steps of:

(b-1) converting the serial receiving data into parallel data, and then comparing the parallel data with said offset value;

(b-2) compressing signals obtained after the comparison at said step (b-1), and summing the compressed signals; and (b-3) comparing the signal obtained after the summing at said step (b-2) with the threshold value, thereby determining whether or not the serial receiving data is valid data.

* * * * *